United States Patent [19]
Oda et al.

[11] Patent Number: 6,157,674
[45] Date of Patent: Dec. 5, 2000

[54] AUDIO AND VIDEO DATA TRANSMITTING APPARATUS, SYSTEM, AND METHOD THEREOF

[75] Inventors: Tsuyoshi Oda, Chiba; Satoshi Miyazawa, Kanagawa, both of Japan

[73] Assignee: Sony Corporation, Tokyo, Japan

[21] Appl. No.: 08/825,702

[22] Filed: Mar. 19, 1997

[30] Foreign Application Priority Data

Mar. 21, 1996 [JP] Japan .................................. 8-064816

[51] Int. Cl.[7] ................................................ H04N 5/262
[52] U.S. Cl. .................... 375/240; 375/240.01; 370/94; 370/503; 370/509; 370/528; 370/538
[58] Field of Search ............................. 348/423, 845.1, 348/845.2, 845.3, 385, 386, 419, 461, 462, 721, 464, 474; 370/17

[56] References Cited

U.S. PATENT DOCUMENTS

| | | | |
|---|---|---|---|
| 5,420,866 | 5/1995 | Wasilewski | 348/474 |
| 5,442,390 | 8/1995 | Hooper et al. | 348/7 |
| 5,448,568 | 9/1995 | Delpuch et al. | 348/423 |
| 5,467,342 | 11/1995 | Logston et al. | 370/17 |
| 5,550,589 | 8/1996 | Shiojiri et al. | 348/423 |
| 5,561,466 | 10/1996 | Kiriyama | 348/423 |
| 5,572,333 | 11/1996 | Moriyama et al. | 386/98 |
| 5,640,388 | 6/1997 | Woodhead et al. | 348/464 |
| 5,668,601 | 9/1997 | Okada et al. | 348/423 |
| 5,726,989 | 3/1998 | Dokic | 348/423 |
| 5,802,068 | 9/1998 | Kudo | 370/538 |
| 5,828,414 | 10/1998 | Perkins et al. | 348/423 |
| 5,937,138 | 8/1999 | Fukuda et al. | 386/112 |

*Primary Examiner*—Andy Rao
*Assistant Examiner*—Shawn S. An
*Attorney, Agent, or Firm*—Frommer Lawrence & Haug, LLP.; William S. Frommer; Joe H. Shallenburger

[57] ABSTRACT

An apparatus, system, and method for compressing and coding audio and/or video data by the MPEG2 system or the like, multiplexing the same, and transmitting the resultant data via a digital line. When generating a transport stream for transmitting a PES packet of the MPEG2 system, the amounts of the compressed video data and the compressed audio data are defined as whole multiples of the amount of the transport packet (188 bytes) of the MPEG2 system, thereby to bring the boundary of the frame cycle of the audio and/or video data and the boundary of the transport packet into coincidence. Where the amount of data is arbitrary, calculation etc. of the offset value which becomes necessary at the scheduling is made unnecessary.

17 Claims, 16 Drawing Sheets

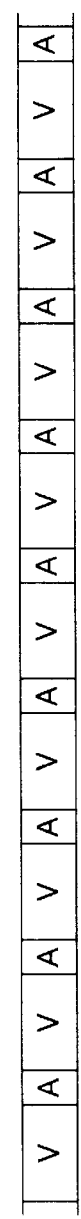
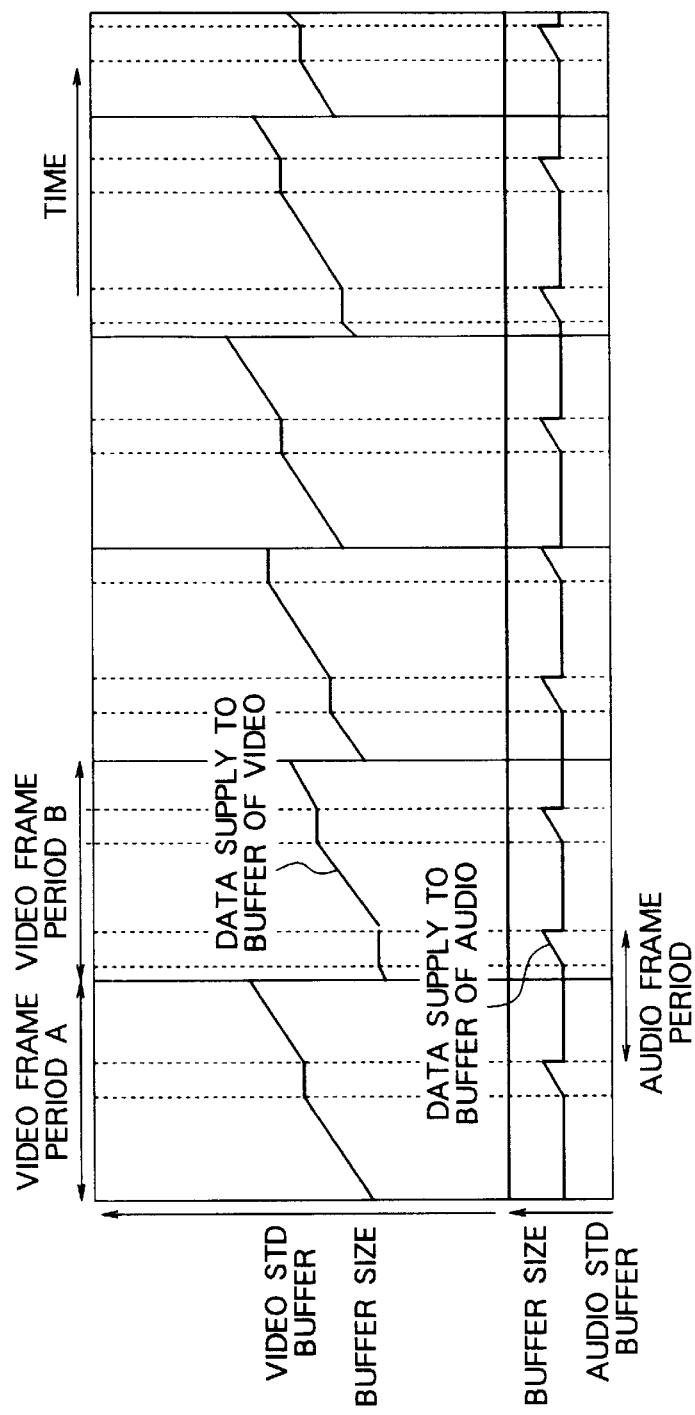
FIG. 6A
FIG. 6B

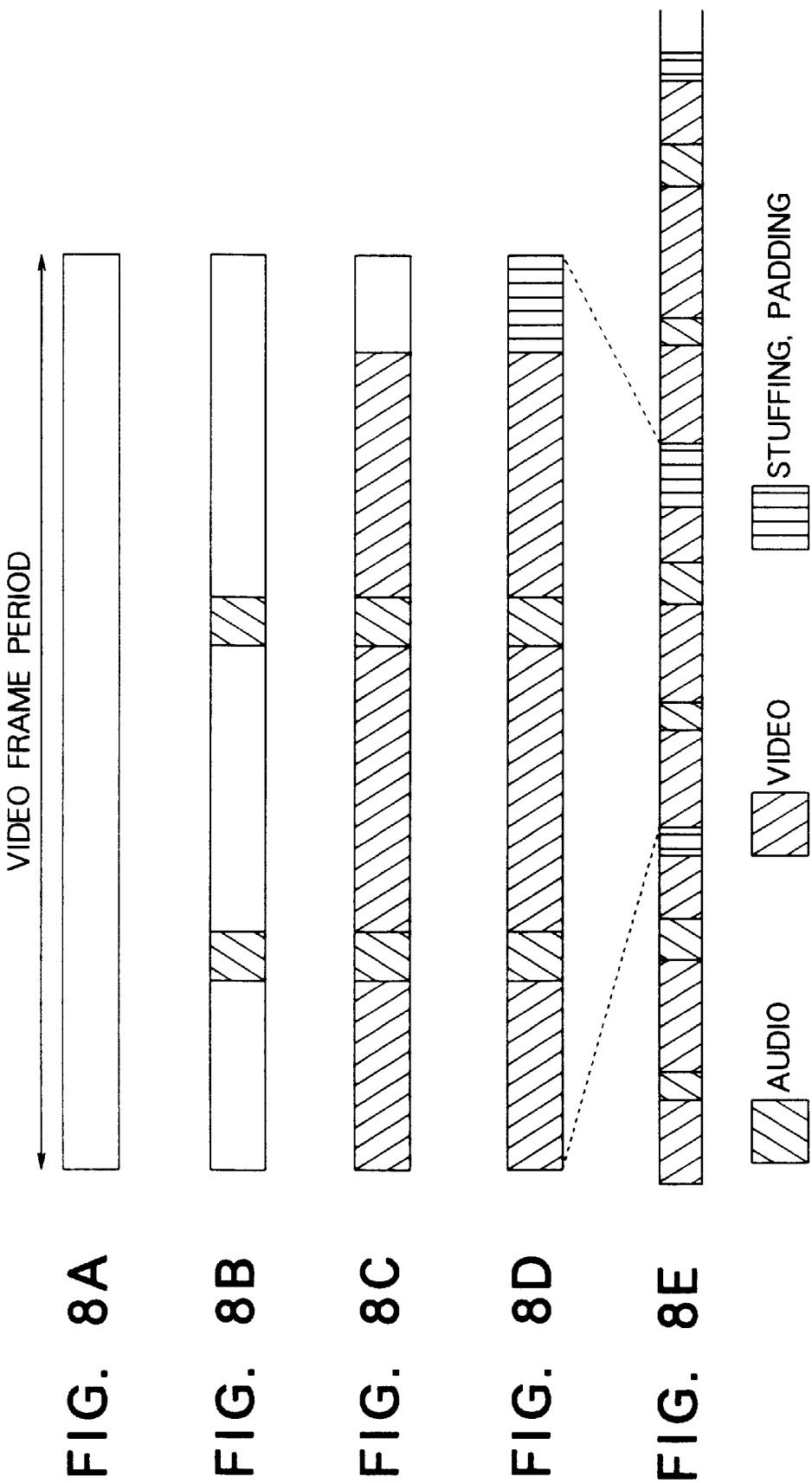

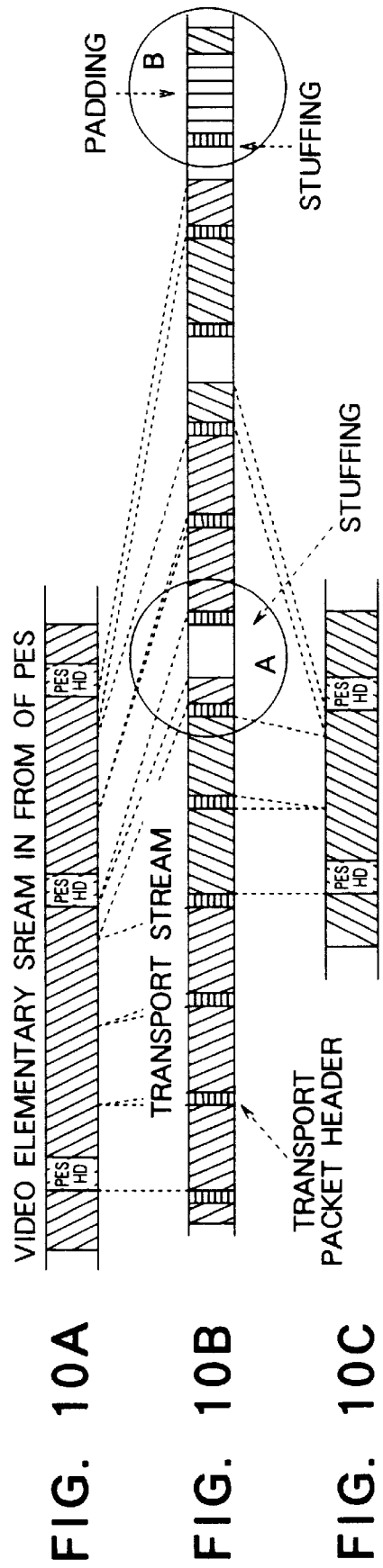

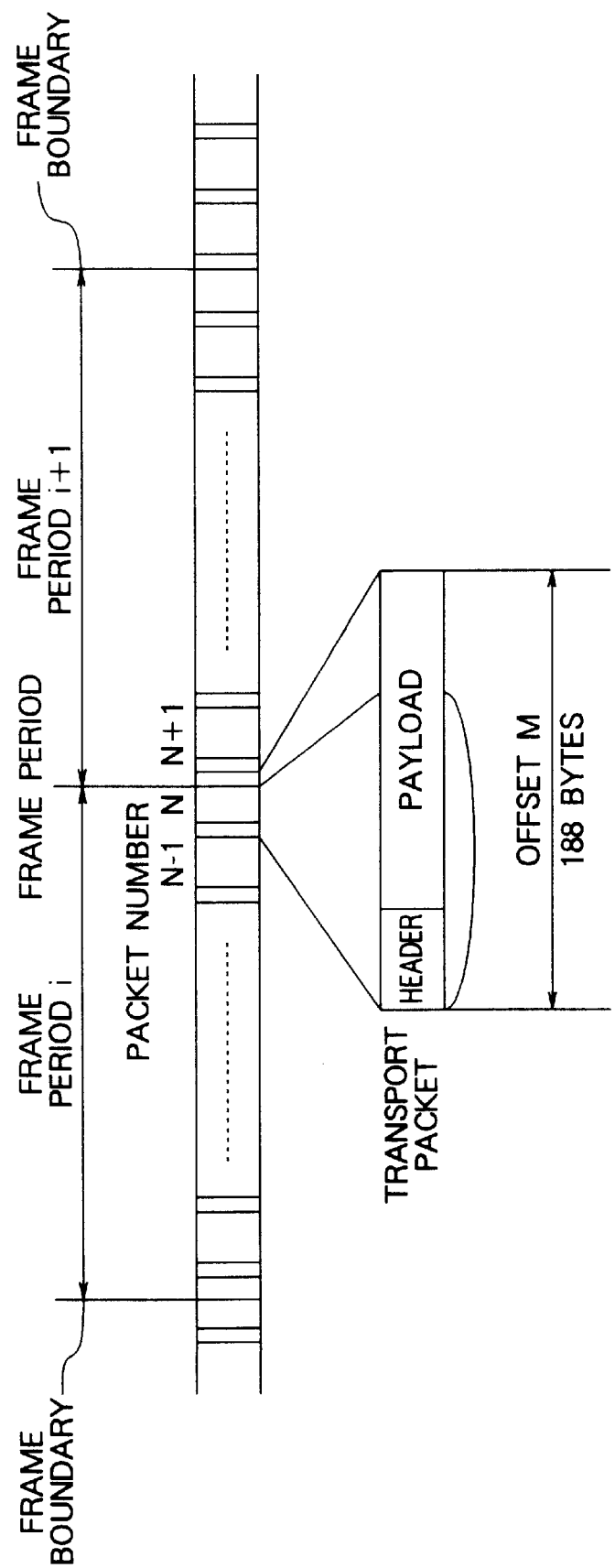

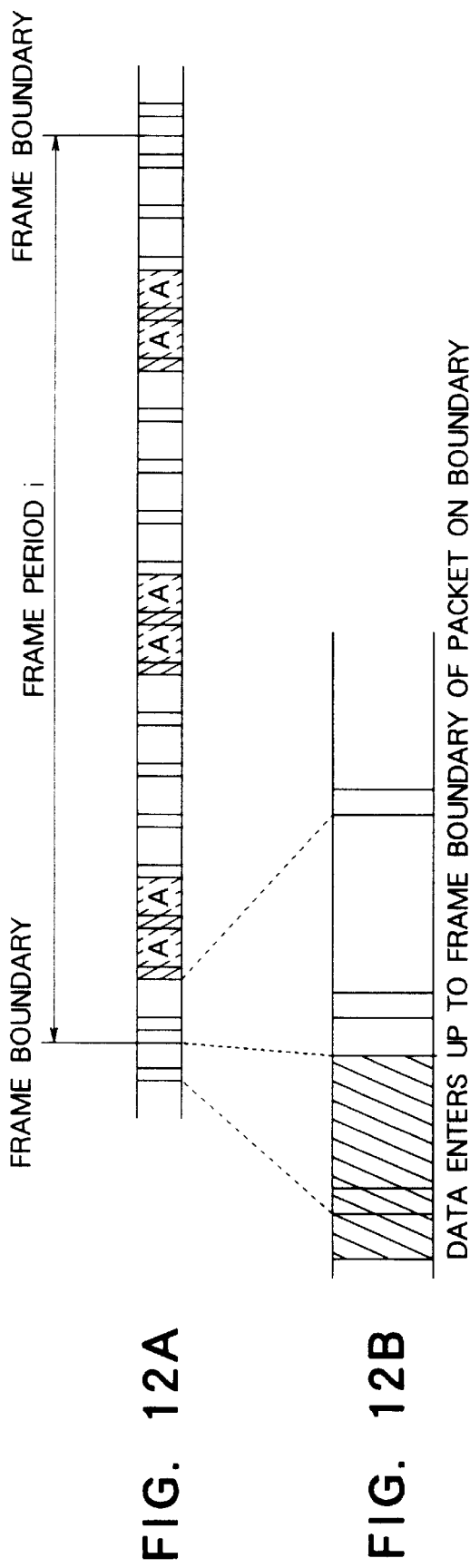
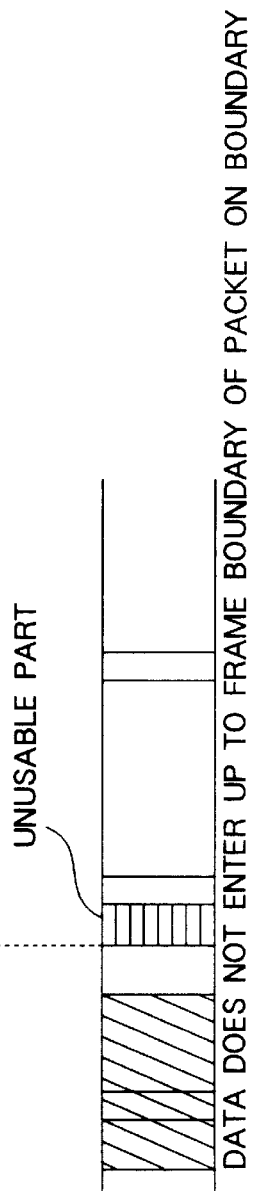
FIG. 12A
FIG. 12B
FIG. 12C

AUDIO AND VIDEO DATA TRANSMITTING APPARATUS, SYSTEM, AND METHOD THEREOF

BACKGROUND OF THE INVENTION

1. Field of the Invention

The present invention relates to an audio and/or video data transmitting apparatus for transmitting digital audio and/or video data via an asynchronous transfer mode (ATM) communication line or the like and a system and method of the same.

2. Description of the Related Art

Compression and coding systems such as the MPEG (Moving Picture Experts Group) 2 system have come into practical use for compressing and coding the audio data and video data (audio and/or video data) of moving pictures such as movies.

Further, as a system for transmitting extremely large volumes of data, for example, audio data, the ATM system has been proposed. Studies are now being made on transmitting the audio and/or video data compressed and coded by the MPEG2 system or the like via an ATM system or other high speed digital communication lines.

When audio and/or video data compressed and coded by the MPEG2 system (compressed audio and/or video data) is transmitted via a communication line of the ATM system, the compressing and coding apparatus on the transmission side must control the amount of data of the generated compressed audio and/or video data (code generation amount control (rate control)) so that neither overflow nor underflow occur in a video STD buffer (VBV (video buffer verifier) buffer) and an audio STD buffer (ABV (audio buffer verifier) on the reception side.

The compressing and coding apparatus on the transmission side has to perform the rate control while calculating the remaining capacity of the STD buffers on the reception side. However, the calculation of the remaining capacity of the STD buffers on the reception side is complex and difficult.

Further, when the timing of the compression and coding on the transmission side is poor, depending on the remaining capacity, there is a possibility that the overflow and underflow (breakdown) will be caused in the STD buffers on the reception side. Further, a multiplexing device performs multiplexing for each elementary stream of the compressed audio data and compressed video data to a predetermined transport stream so as not to cause a breakdown in the STD buffers. When the plan is inadequate, even if the rate control of the elementary stream generated by the compressing and coding apparatus is correct, a breakdown sometimes will occur in the STD buffers.

SUMMARY OF THE INVENTION

An object of the present invention is to provide an audio and/or video data transmitting apparatus capable of simplifying and facilitating the calculation of the remaining capacity of the STD buffers on the reception side when the audio and/or video data is compressed and coded by the MPEG2 system or the like on the transmission side and transmitted via a high speed digital communication line such as an ATM communication line and a system and method of the same.

Further, another object of the present invention is to provide an audio and/or video data transmitting apparatus not causing a breakdown such as overflow or underflow in the STD buffers on the reception side even if the audio and/or video data is compressed and coded by the MPEG2 system or the like on the transmission side and transmitted via a high speed digital communication line such as an ATM communication line and a system and method of the same.

To attain the above objects, according to a first aspect of the present invention, there is provided a transmitting apparatus for multiplexing a video signal and an audio signal, accommodating the video signal or audio signal in a transport packet, and transmitting the same, wherein the amount of data transmitted in a video frame cycle is a whole multiple of the transport packet.

Preferably, the transmitting apparatus accommodates a video signal and/or audio signal of a whole multiple of a size of the transport packet in the video frame cycle minus a size of the header of the transport packet.

Preferably, the transmitting apparatus has a video buffer for receiving the video signal; an audio buffer for receiving the audio signal; a means for selectively taking out the video signal or audio signal from the video buffer or audio buffer; an accommodating means for accommodating the taken out video signal or audio signal in a payload area of the transport packet; and a means for controlling the selective taking out means and the accommodating means; the control means controlling the selective taking out means and the accommodating means so that the amount of data output from the transmitting apparatus in a video frame cycle becomes a whole multiple of the transport packet.

Preferably, the control device supervises an empty size of the video buffer and controls the selective taking out means and the accommodating means so that the amount of the video signal to be multiplexed in the video cycle is adjusted in accordance with the detected empty size.

Preferably, the selective taking out means and the accommodating means take out the audio signal from the audio buffer and accommodate the same so that the audio signal from the audio buffer is accommodated in the transport packet of a period determined in advance in the video frame cycle.

Preferably, the selective taking out means and the accommodating means take out the video signal from the video buffer and accommodate the same so that the video signal is accommodated in a payload part of the transport packet in which the audio signal is not accommodated.

According to another aspect of the present invention, there is provided a transmitting system having a video encoder for encoding the video signal; an audio encoder for encoding the audio signal; a video buffer for receiving the encoded video signal; an audio buffer for receiving the encoded audio signal; a means for selectively taking out the video signal or audio signal from the video buffer or audio buffer; an accommodating means for accommodating the taken out video signal or audio signal in a payload area of the transport packet; and a means for controlling the selective taking out means and the accommodating means; wherein the control means controls the selective taking out means and the accommodating means so that the amount of data output from the transmitting system in the video frame cycle becomes a whole multiple of the transport packet.

According to still another aspect of the invention, there is provided a transmitting method for multiplexing a video signal and an audio signal, accommodating the video signal or audio signal in a transport packet, and transmitting the same, wherein the amount of data transmitted in a video frame cycle is a whole multiple of the transport packet.

BRIEF DESCRIPTION OF THE DRAWINGS

These and other objects and features of the present invention will become clearer from the following description of the preferred embodiments given with reference to the attached drawings, in which:

FIGS. 6A and 6B are views of the amount of occupied data of the video STD buffer and the audio STD buffer where compressed video data and compressed audio data demultiplexed from a transport packet which was multiplexed and transmitted by the audio and/or video data transmitting apparatus (FIG. 1) are respectively buffered;

FIGS. 8A to 8E are views of the scheduling by the scheduling circuit (FIG. 1);

FIGS. 10A to 10C are views of a processing for adding a PES header to elementary streams of the compressed video data and the compressed audio data, multiplexing the same, and further adding a transport packet header to this;

FIG. 11 is a view of a boundary of a frame cycle on the transport stream transmitted by the audio and/or video data transmitting apparatus (FIG. 1) to the audio and/or video data receiving apparatus (FIG. 2);

FIGS. 12A to 12C are views of the condition of a valid multiplexing space in the first part of the frame cycle;

DESCRIPTION OF THE PREFERRED EMBODIMENTS

First Embodiment

Below, an explanation will be made of a first embodiment of the present invention.

Figure 1:
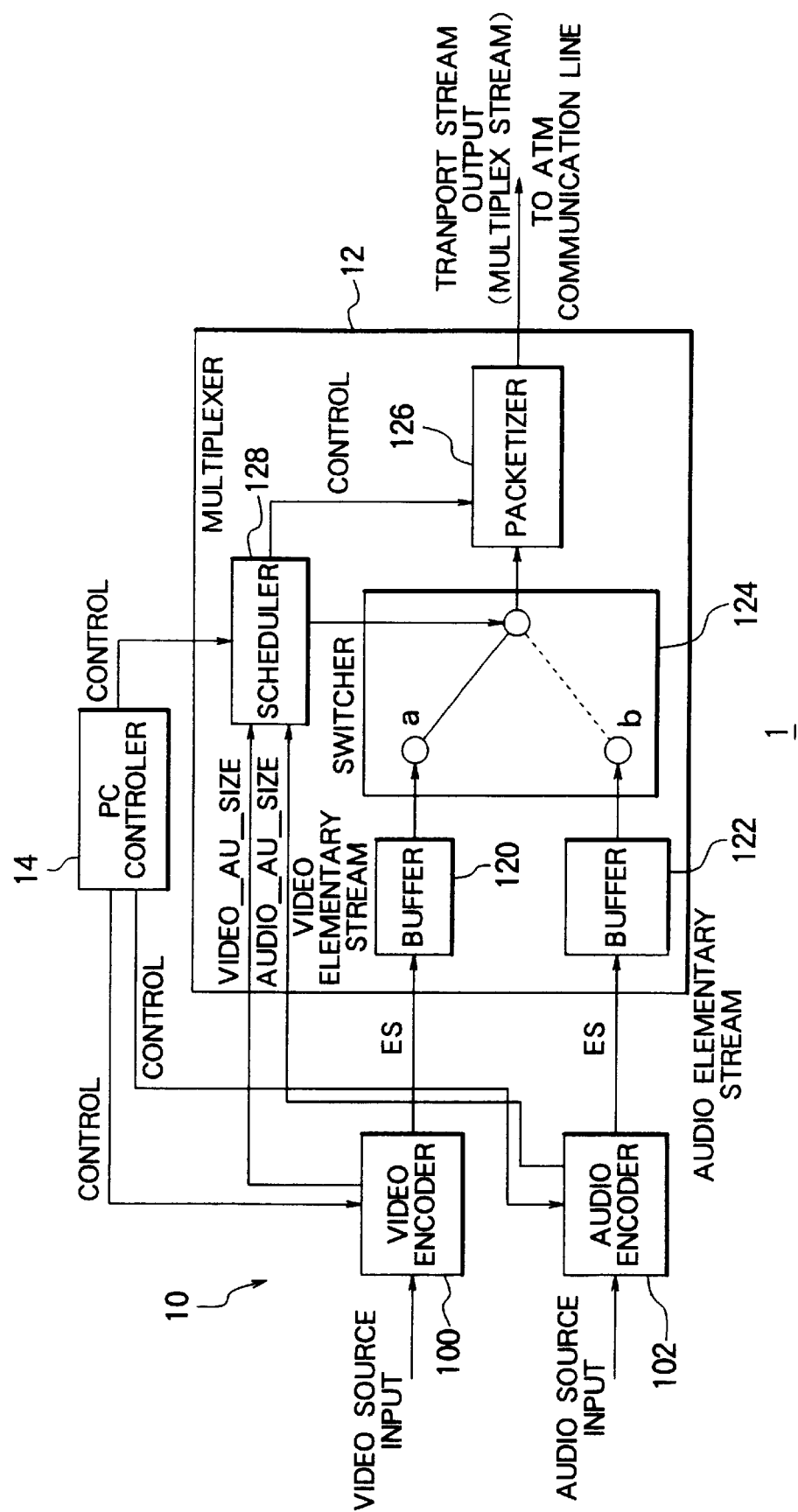
FIG. 1 is a view of the configuration of an audio and/or video data transmitting apparatus according to the present invention.

FIG. 1 is a view of the configuration of an audio and/or video data transmitting apparatus 1 according to the present invention.

Figure 2:
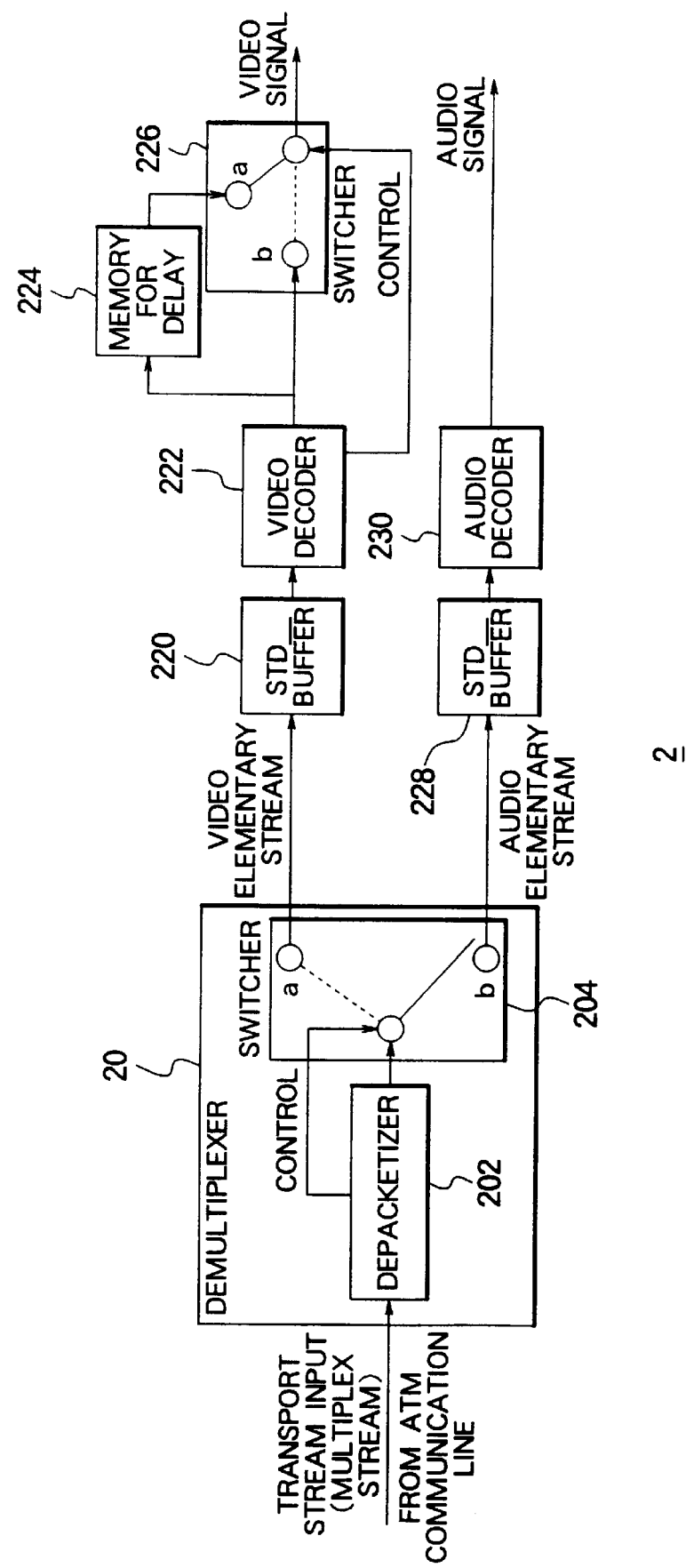
FIG. 2 is a view of the configuration of an audio and/or video data receiving apparatus according to the present invention.

FIG. 2 is a view of the configuration of an audio and/or video data receiving apparatus 2 according to the present invention.

As shown in FIG. 1, the audio and/or video data transmitting apparatus 1 is constituted by a compression and coding unit 10, a multiplexing unit (multiplexer) 12, and a control use computer 14.

The compression and coding unit 10 is constituted by a video data compressing and coding unit (video encoder) 100 and an audio data compressing and coding unit (audio encoder) 102.

The multiplexing unit 12 is constituted by a video buffer 120, an audio buffer 122, a switch circuit (switcher) 124, a packetizing circuit (packetizer) 126, and a scheduling circuit (scheduler) 128.

The audio and/or video data transmitting apparatus 1 compresses and codes the audio data and video data (audio and/or video data) of the moving picture of a movie or the like being input by these constituent parts according to for example the MPEG2 system, multiplexes the same, generates a transport stream, and transmits this to the audio and/or video data receiving apparatus 2 (FIG. 2) via a communication line of for example an ATM system (ATM communication line).

As shown in FIG. 2, the audio and/or video data receiving apparatus 2 is connected to the audio and/or video data transmitting apparatus 1 via for example the ATM communication line and is constituted by a demultiplexing unit (demultiplexer) 20, a video STD buffer 220, a video expansion decoder (video decoder) 222, a memory 224 for delay, a switch circuit 226, an audio STD buffer 228, and an audio expansion decoder (audio decoder) 230.

The demultiplexing unit 20 is constituted by a depacketizing circuit (depacketizer) 202 and a switch circuit 204.

The audio and/or video data receiving apparatus 2 receives the compressed audio and/or video data transmitted from the audio and/or video data transmitting apparatus 1 (FIG. 1) via the ATM communication line by these constituent parts, demultiplexes the same to the compressed audio data and the compressed video data, expands and decodes the compressed audio data and the compressed video data, and outputs the audio data and the video data.

Note that, below, for simplification of the explanation, an explanation will be made of the case where only audio data and video data (audio and/or video data) are transmitted between the audio and/or video data transmitting apparatus 1 (FIG. 1) and the audio and/or video data receiving apparatus 2 (FIG. 2).

In the audio and/or video data transmitting apparatus 1 (FIG. 1), the control use computer (PC computer) 14 is a computer for example for control and controls the operation of the constituent parts of the audio and/or video data transmitting apparatus 1.

The video encoder 100 compresses and codes the video data input from an outside apparatus such as an editing apparatus or a VTR apparatus by for example the MPEG2 system and outputs the same as the compressed video data (video elementary stream) to the video buffer 120. Further, the video encoder 100 outputs the amount of data of the generated compressed video data (access unit (AU) size corresponding to one frame's worth of compressed video data) for every frame period of the input audio and/or video data to the scheduling circuit 128.

The audio encoder 102 compresses and codes the audio data input from the external apparatus by for example the MPEG2 system in the same way as the video encoder 100 and outputs the same as the compressed audio data (audio elementary stream) to the audio buffer 122. Further, the audio encoder 102 outputs the AU size of the generated compressed audio data (for example, a layer I and 348 samples and layer II and 1152 samples in the MPEG2 system, where the AU size of the compressed audio data changes according to the sampling frequency) for every frame period of the input audio and/or video data to the scheduling circuit 128.

The video buffer 120 buffers the compressed video data input from the video encoder 100 and outputs the same to an input terminal a of the switch circuit 124.

The audio buffer 122 buffers the compressed audio data input from the audio encoder 102 and outputs the same to an input terminal b of the switch circuit 124.

The scheduling circuit 128 performs a predetermined calculation based on the AU size information input from the video encoder 100 and the audio encoder 102, performs the scheduling of the multiplexing, and controls the connection between the input terminal and the output terminal of the switch circuit 124. Further, the scheduling circuit 128 controls the PES packetizing processing in the packetizing circuit 126. Further, the scheduling circuit 128 generates the transport packet (padding packet) of the MPEG2 system accommodating zero data having no meaning in the payload part according to need, outputs the same to the switch circuit 124, and makes the switch circuit 124 output this in place of the compressed video data and the compressed audio data.

Figure 3:
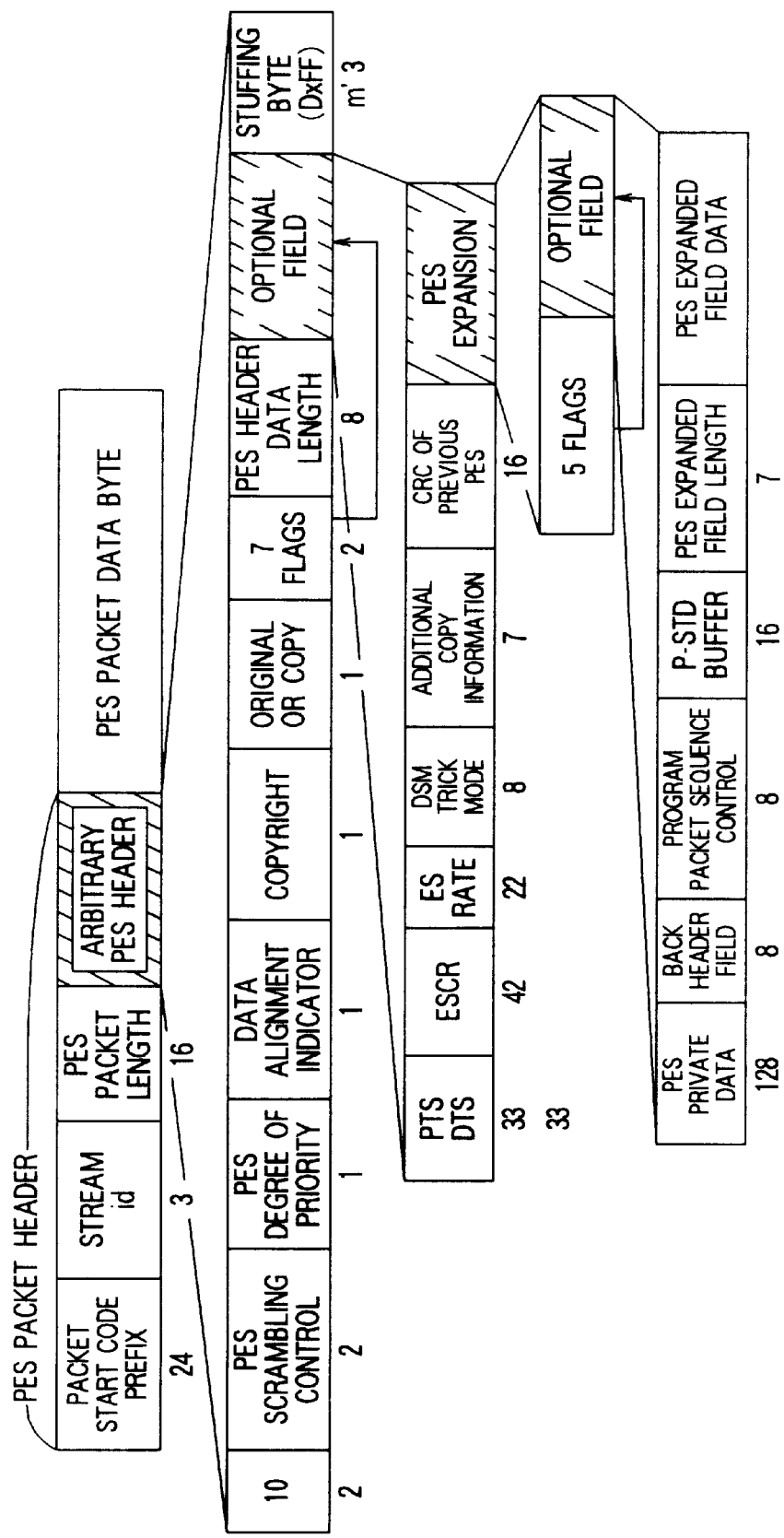
FIG. 3 is a view of the configuration of a packetized elementary stream (PES) packet of the MPEG2 system.

FIG. 3 is a view of the configuration of a PES packet of the MPEG2 system.

Figure 4:
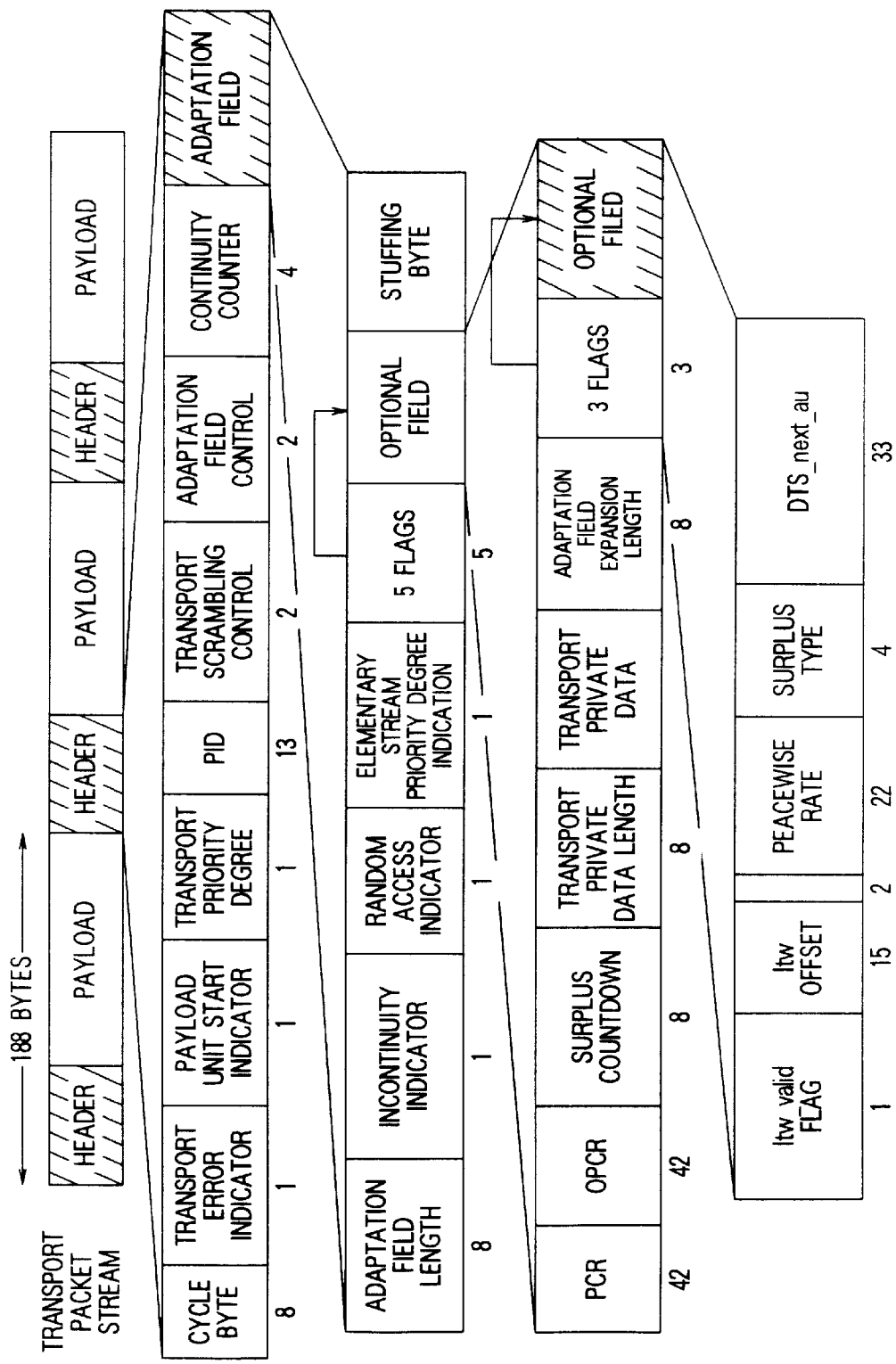
FIG. 4 is a view of the configuration of a transport packet of the MPEG2 system.

FIG. 4 is a view of the configuration of the transport packet of the MPEG2 system.

The switch circuit 124 selects the compressed video data or the compressed audio data respectively input to the input terminals a and b under the control of the scheduling circuit 128, multiplexes these data to generate the multiplexed data stream, and outputs the same from the output terminal to the packetizing circuit 126.

The packetizing circuit 126 performs the PES packetizing for the compressed video data and the compressed audio data multiplexed by the switch circuit 124 by giving a PES packet header (FIG. 3) and further accommodates this in the payload part of the transport packet by giving the header of the transport packet of the MPEG2 system (FIG. 4) (transport packetizing) to generate the transport stream and transmits this via the ATM communication line to the audio and/or video data receiving apparatus 2 (FIG. 2).

In the audio and/or video data receiving apparatus 2 (FIG. 2), the depacketizing circuit 202 of the demultiplexing unit 20 demultiplexes the transport packet header from the transport stream received from the audio and/or video data transmitting apparatus 1 via the ATM communication line and further removes the padding packet (Null packet) and reproduces the PES packet and further removes the PES packet header from the reproduced PES packet and outputs the same to the input terminal of the switch circuit 204. Further, the depacketizing circuit 202 controls the connection between the input terminal and output terminal of the switch circuit 204.

The switch circuit 204 outputs the compressed video data from the output terminal a to the video STD buffer 220 and outputs the compressed audio data from the output terminal b to the audio STD buffer 228 under the control of the depacketizing circuit 202 and demultiplexes the compressed video data and the compressed audio data.

The video STD buffer 220 buffers the compressed video data input from the switch circuit 204 and supplies the same to the video expansion decoder 222.

The audio STD buffer 228 buffers the compressed audio data input from the switch circuit 204 and supplies the same to the audio expansion decoder 230.

The video expansion decoder 222 temporarily reads one AU worth of the compressed video data from the video STD buffer 220 at a predetermined timing, expands and decodes the same by the MPEG2 system corresponding to the video encoder 100 of the audio and/or video data transmitting apparatus 1, and outputs the video data obtained as a result of the expansion and decoding to the memory 224 for delay and the input terminal b of the switch circuit 226. Further, the video expansion decoder 222 controls the connection between the input terminal and the output terminal of the switch circuit 226.

The delay use memory 224 stores the P frame of the compressed video data for correcting the frames changed in order for forward/backward prediction coding to an original order (display order) in the video encoder 100 and outputs the same to the input terminal a of the switch circuit 226.

The switch circuit 226 selects either of the video data input from the video expansion decoder 222 or the video data output from the delay use memory 224 and corrects the order of the video data to the order of display.

The audio expansion decoder 230 temporarily reads one AU worth of the compressed audio data from the audio STD buffer 228 at a predetermined timing, expands and decodes the same by the MPEG2 system corresponding to the audio encoder 102 of the audio and/or video data transmitting apparatus 1, and outputs the audio data (audio signal) obtained as a result of the expansion and decoding to the outside.

Below, an explanation will be made of the operation of the audio and/or video data transmitting apparatus 1 (FIG. 1) and the audio and/or video data receiving apparatus 2.

The video encoder 100 of the audio and/or video data transmitting apparatus 1 compresses and codes the input video data while performing code generation amount control (rate control) so as to allow neither overflow nor underflow in the video STD buffer 220 of the audio and/or video data receiving apparatus 2. The audio encoder 102 compresses and codes the input audio data. Below, the rate control of the video encoder 100 will be explained by referring to FIGS. 5A and 5B.

Figure 5A:
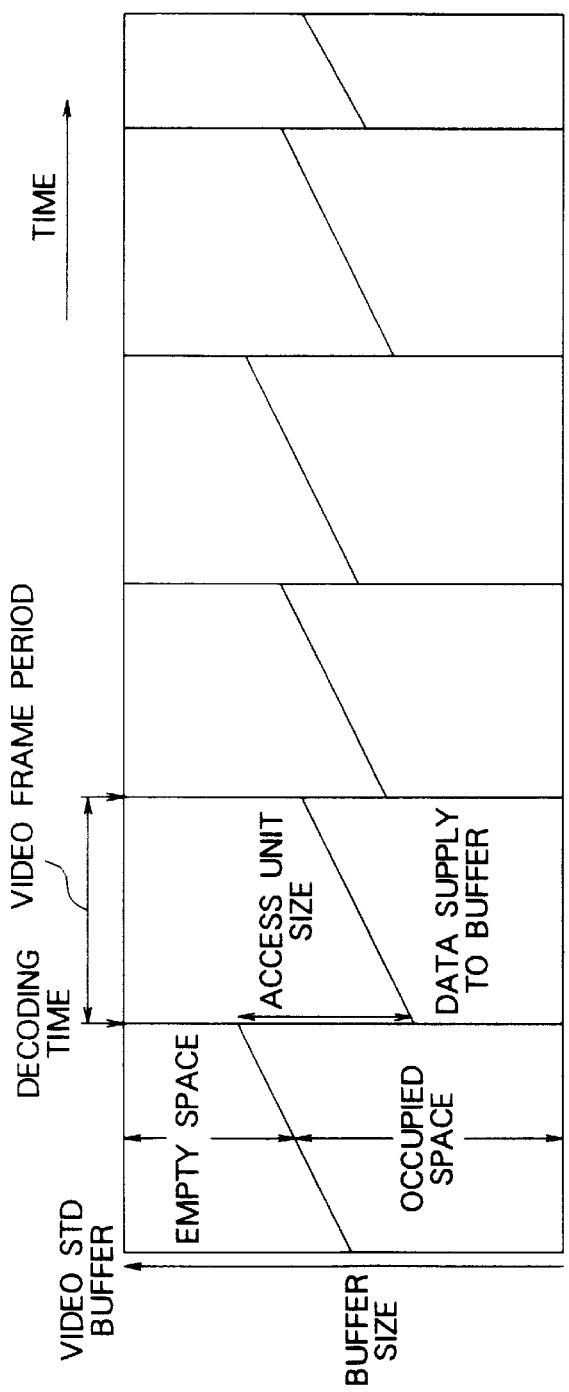
FIGS. 5A and 5B are views of the change in the amount of occupation by data in the case of a video STD buffer and an audio STD buffer shown in FIG. 2 performing ideal operations.
Figure 5B:
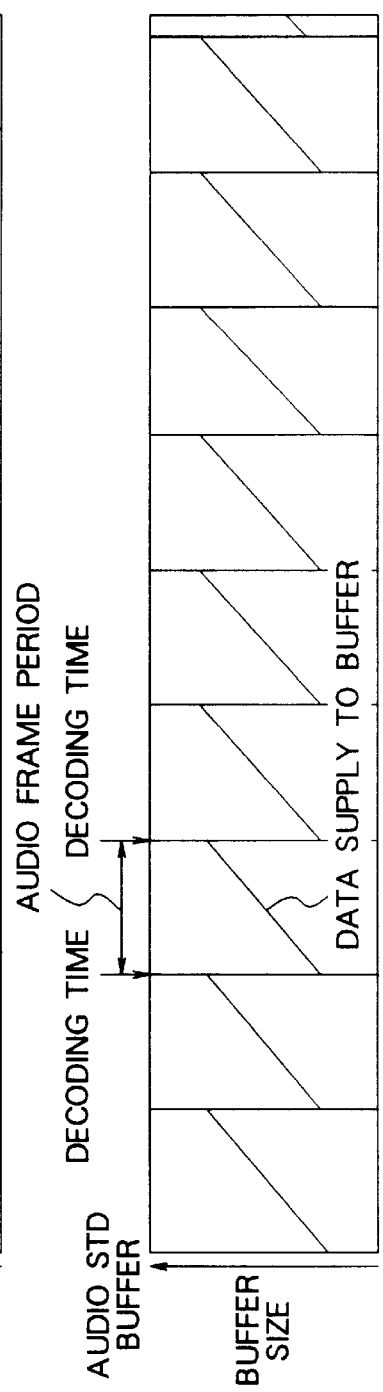

FIGS. 5A and 5B are views of the changes in the amount of occupation by data when the video STD buffer 220 and the audio STD buffer 228 shown in FIG. 2 perform an ideal operation. Note that, the abscissas of the graphs shown in FIGS. 5A and 5B indicate the time, and the ordinates indicate the amounts of the occupied data of the compressed video data and the compressed audio data in the video STD buffer 220 and the audio STD buffer 228, respectively.

Further, the sawtooth-like solid lines of FIGS. 5A and 5B indicate the amounts of the occupied data in the video STD buffer 220 and the audio STD buffer 228, the lower side from the solid line indicates the amount of occupied data, and the upper side from the solid line indicates the empty capacities (remaining buffer spaces) of the video STD buffer 220 and the audio STD buffer 228. Further, in the sawtooth-like solid lines shown in FIGS. 5(A) and 5(B), the hatched parts indicate the periods for which the data to the video STD buffer 220 and the audio STD buffer 228 are input, and the vertical parts indicate timings for reading the access unit (AU) from the video STD buffer 220 and the audio STD buffer 228 for the expansion-decoding processing by the video expansion decoder 222 and the audio expansion decoder 230, respectively.

As shown in FIGS. 5A and 5B, in the MPEG2 system, as the ideal operation, it is prescribed that the video expansion decoder 222 and the audio expansion decoder 230 instantaneously read the access unit (AU) from the video STD buffer 220 and the audio STD buffer 228 and perform the expansion-decoding processing. Coding is carried out by considering virtual buffers (VBV buffer and ABV buffer) supposing these video STD buffer 220 and audio STD buffer 228 and the scheduling of multiplexing is carried out. The AU size of the compressed audio data buffered in the audio STD buffer 228 is fixed, so there is no change along with time in the sawtooth-like solid line as shown in FIG. 5B.

On the other hand, the compressed video data buffered in the video STD buffer 220 has a different AU size for every picture due to the principles of compression and coding by the MPEG2 system. For this reason, the amount of occupation by data of the video STD buffer 220 fluctuates for every picture and the length of the vertical part of the sawtooth-like solid line shown in FIG. 5A fluctuates. Further, the AU size of the compressed video data greatly differs depending on the picture coding type. That is, the AU size becomes a very different value according to whether the picture of the compressed video data is an I picture (intra-coded picture), a P picture (predictive coded picture), or a B picture (bi-directionally coded picture).

Accordingly, so as to prevent the compressed video data from overflowing from the video STD buffer 220 of the audio and/or video data receiving apparatus 2 and prevent the compressed video data buffered in the video STD buffer 220 from underflowing at the reading from the video expansion decoder 222, the video encoder 100 of the audio and/or video data transmitting apparatus 1 generates the compressed video data while performing the control, that is, the rate control, with respect to the amount of the generated compressed video data as shown in FIG. 5A.

The video buffer 120 buffers the compressed video data generated by the video encoder 100, while the audio buffer 122 buffers the compressed audio data generated by the audio encoder 102.

The switch circuit 124 multiplexes the compressed video data and the compressed audio data under the control of the scheduling circuit 128 and generates a multiplexed data stream. Here, for easy understanding, the switch circuit 124 was shown, but in actuality, the switching is carried out by selectively controlling the reading of the buffers 120 and 222.

The packetizing circuit 126 performs the PES packetizing for the multiplexed data stream and further performs the transport packetizing to generate the transport stream and transmits the same to the ATM communication line.

Below, an explanation will be made of the scheduling by the scheduling circuit 128 by referring to FIGS. 6A and 6B.

FIGS. 6A and 6B are views showing the amount of occupation of data of the video STD buffer 220 and the audio STD buffer 228 where the compressed video data and the compressed audio data demultiplexed from the transport packet multiplexed and transmitted by the audio and/or video data transmitting apparatus 1 are respectively buffered.

In the same way as in FIG. 5A and FIG. 5B, in FIGS. 6A and 6B as well, the part of hatching of the sawtooth-like solid line indicates a range where the compressed video data (video data stream) and compressed audio data (audio data stream) are supplied to the video STD buffer 220 and the audio STD buffer 228, respectively, and a vertical part of the sawtooth-like solid line indicates the timings when the access units (AU) of the compressed video data and the compressed audio data are respectively read from the video STD buffer 220 and the audio STD buffer 228. In FIGS. 6A and 6B, however, as the bit rate of the data supplied to the video STD buffer 220 (supply bit rate), a value obtained by adding the bit rate of the compressed video data and the bit rate of the compressed audio data is shown.

Here, when the bit rate of the compressed video data input to the video STD buffer 220 is defined as Rv, the bit rate of the compressed audio data input to the audio STD buffer 228 is defined as Ra, and the data rate (multiplexing bit rate) of the multiplexed data stream obtained by multiplexing these data is defined as Rm, the relationship can be represented by Equation 1 shown below:

$$Rm = Rv + Ra \tag{1}$$

In actuality, however, the value of the multiplexing bit rate Rm is set to a large value with sufficient margin as shown in the following Equation 2:

$$Rm = Rv + Ra + a \tag{2}$$

In FIGS. 6A and 6B, the horizontal part of the solid line indicates the period where the input of the compressed video data and the compressed audio data to the video STD buffer 220 and the audio STD buffer 228 is stopped.

As shown in FIGS. 6A and 6B, the supplying of the elementary streams (compressed video data and compressed audio data) from the multiplexed data streams to the video STD buffer 220 and the audio STD buffer 228 are alternately carried out by the switching of the switch circuit 204.

Accordingly, the transition of the amounts of occupation by data of the video STD buffer 220 and the audio STD buffer 228 where the elementary streams are multiplexed and demultiplexed and the transition of the amounts of occupation by data of the video STD buffer 220 (VBV buffer) and audio STD buffer 228 (ABV buffer) calculated at the video encoder 100 and the audio encoder 102 become different.

That is, as shown in Equation 1, even if the video encoder 100 and the audio encoder 102 set the multiplexing bit rate to a value obtained by simply adding the bit rate of the compressed video data and the bit rate of the compressed audio data and performs the rate control, where the amounts of occupation of data of the video STD buffer 220 and the audio STD buffer 228 are the values immediately before the overflow and underflow, it is not guaranteed that the breakdown will not occur in the video STD buffer 220 and the audio STD buffer 228.

Further, where the transmission is performed to an ATM communication line, a PES header of a fluctuating amount of data (due to the fact that the conditions of adding PTS/DTS are different according to the picture coding type) and the transport packet header of a fluctuating amount of data due to the supply of the PCR are added to the multiplexed data stream. Further, for the alignment of the transport packet header and the PES header, the required stuffing bytes (I) are placed in the stuffing byte area of the transport packet header. Therefore the value of the bit rate (transport rate) of the transport stream output by the packetizing circuit 126 must be set to a larger value with a sufficient margin than a simple added value of the bit rate of the compressed video data and the bit rate of the compressed audio data.

In this way, when the value of the transport rate is set to be a larger value than the added value of the bit rate of the compressed video data and the bit rate of the compressed audio data, it is necessary not only to simply change the compressed video data and the compressed audio data by the switch circuit 124 for the connection, but also necessary to insert a padding packet (all 0) according to need and adjust the supply of the data to the video STD buffer 220 and the audio STD buffer 228. The scheduling circuit 128 appropriately inserts the padding data into the multiplexed data stream in this way and performs the scheduling.

The compressed video data and the compressed audio data which are compressed and coded as described above and transmitted from the audio and/or video data transmitting apparatus 1 via the ATM communication line to the audio and/or video data receiving apparatus 2 (FIG. 2) are demultiplexed by the depacketizing circuit 202 of the demultiplexing unit 20 and buffered in the video STD buffer 220 and the audio STD buffer 228, respectively by the switch circuit 204.

The video expansion decoder 222 and the audio expansion decoder 230 read the compressed video data and the compressed audio data from the video STD buffer 220 and the audio STD buffer 228, respectively, and perform the expansion-decoding.

The delay use memory 224 and the switch circuit 226 delay the video data output by the video expansion decoder 222 according to need and output the same while matching the timing with that of the audio data output by the audio expansion decoder 230.

According to the audio and/or video data transmitting apparatus 1 and the audio and/or video data receiving apparatus 2 explained above in the first embodiment, the video data and audio data compressed and coded by the MPEG2 system can be multiplexed in the PES packet and further accommodated in the transport packet and transmitted.

Accordingly, the audio and/or video data transmitting apparatus 1 and the audio and/or video data receiving apparatus 2 according to the present invention are preferred for the purpose for generating a transport stream obtained by multiplexing digital data for performing surround processing for the voice of a TV program or making the same cope with multinational languages or for making captions to cope with multinational languages in a digital broadcast system via a satellite communication line, cable (wired) communication line, or ground wave communication line and the compressed video data and the compressed audio data (elementary streams) compressed and coded by a compressing and coding system such as the MPEG2 and transmitting the same.

Note that, the communication line for connecting the audio and/or video data transmitting apparatus 1 and the audio and/or video data receiving apparatus 2 is not limited to an ATM communication line and may be any high speed digital communication line of another transmission system, for example, the SDI system (SMPTE-259M).

Second Embodiment

Below, an explanation will be made of a second embodiment of the present invention.

Figure 7A:
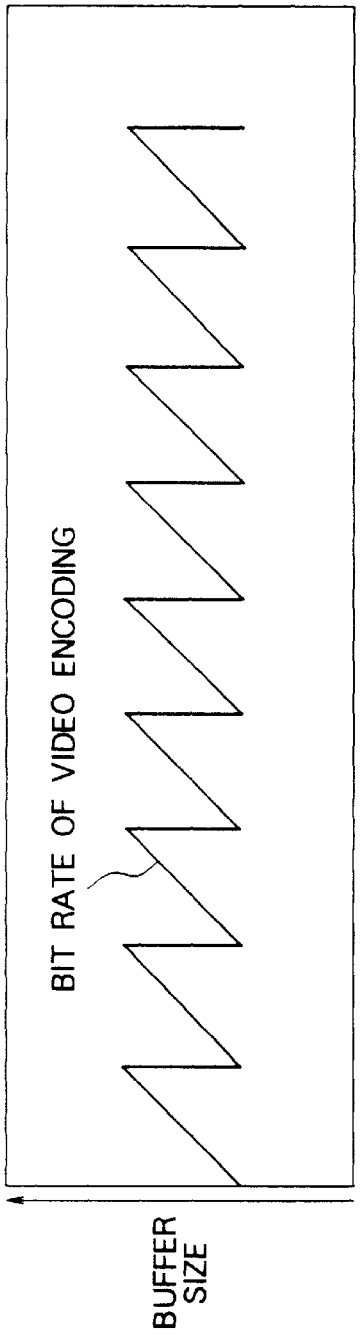
FIG. 7A shows the change of the amount of occupied data of the video STD buffer of the audio and/or video data receiving apparatus (FIG. 2) in the computation in the video data compression and coding unit of the audio and/or video data transmitting apparatus (FIG. 1)
Figure 7B:
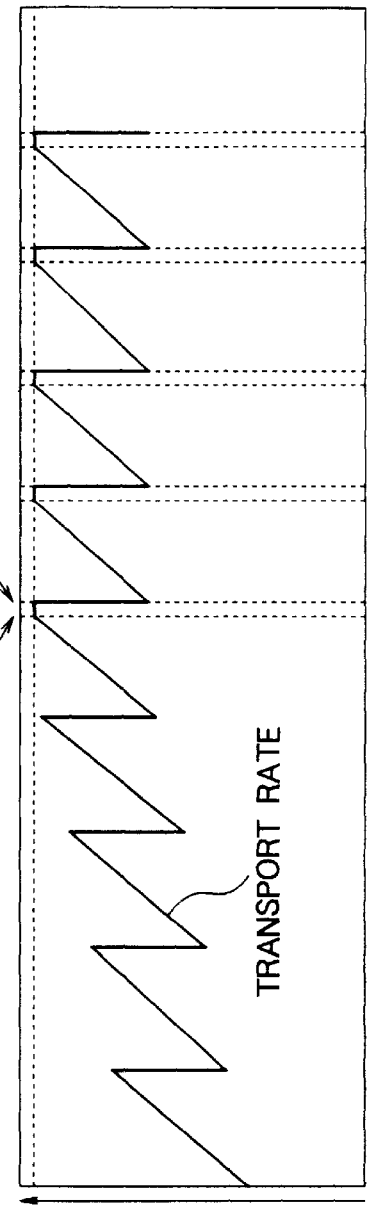
FIG. 7B is a view of the change of the amount of occupation by data of an actual video STD buffer where a scheduling circuit performs scheduling.

FIGS. 7A and 7B are views of the amount of occupation of data of the video STD buffer 220 when the constant of Equation 2 is set to be a sufficiently large value and the transport rate between the audio and/or video data transmitting apparatus 1 (FIG. 1) and the audio and/or video data receiving apparatus 2 (FIG. 2) is set to be a sufficiently large value. FIG. 7A shows the transition of the amount of occupation of data of the video STD buffer 220 of the audio and/or video data receiving apparatus 2 (FIG. 2) in calculation in the video encoder 100 of the audio and/or video data transmitting apparatus 1 (FIG. 1); and FIG. 7B shows the actual transition of the occupied data amount of the video STD buffer 220 where the scheduling circuit 128 performs the scheduling.

The video encoder 100 and the audio encoder 102 compress and code the input video data and audio data, respectively similar to the first embodiment.

Here, as shown in FIG. 7B, when the value of the transport rate is set to be a sufficiently large value as mentioned above, the supply rate of the compressed video data with respect to the video STD buffer 220 becomes high, and therefore the sawtooth-like solid line (amount of occupation of data of the video STD buffer 220) rises after the start of supply. If the video encoder 100 does not stop the supply of the compressed video data as it is, an overflow is caused in the video STD buffer 220 at a time t0.

Accordingly, the scheduling circuit 128 stops the supply of the data from the time t0 to a decoding time t1. That is, the scheduling circuit 128 controls the switch circuit 124 and prevents this from multiplexing the compressed video data and makes it generate a transport stream in which a stuffing byte or a padding packet is multiplexed. The stuffing processing means the insertion of the data of all 1's into the transport packet header for the adjustment of the amount of data in the transport packet. On the other hand, the padding processing means the insertion of a packet of a size equivalent to that of the transport packet for adjusting the amount of data of the transport stream.

The scheduling circuit 128 controls the switch circuit 124 and makes it restart the generation of the transport stream in which the compressed video data are multiplexed since the video expansion decoder 222 reads the access unit (AU) from the video STD buffer 220 and the amount of occupation of data of the video STD buffer 220 is reduced and an empty capacity is produced. The scheduling circuit 128 repeats such a scheduling operation and prevents the breakdown of the video STD buffer 220.

In the scheduling by the scheduling circuit 128 explained in the second embodiment, the compressed audio data is arranged with priority by considering the fact that the buffer side (capacity) of the audio STD buffer 228 for buffering the compressed audio data is small when the compressed video data and the compressed audio data are multiplexed, and the compressed video data is arranged in a period other than the period for which the compressed audio data was arranged. The compressed audio data generated by the audio encoder 102 has a fixed data rate and a constant size of access unit (AU) read from the audio STD buffer 228 to the audio expansion decoder 230 at a constant cycle.

Accordingly, the compressed audio data can be arranged at any position in the transport stream under a condition that a breakdown not be caused in the audio STD buffer 228. In the scheduling by the scheduling circuit 128, after the compressed audio data is arranged at a predetermined position of the transport stream with a priority, the compressed video data is arranged at the remaining position of the transport stream.

In such a case, the scheduling circuit 128 will perform the scheduling at a cycle of the expansion-decoding processing of the video expansion decoder 222 and the audio expansion decoder 230, that is, at the frame cycle of the audio and/or video data input to the audio and/or video data transmitting apparatus 1 by considering the amount of occupation of data of the video STD buffer 220.

FIGS. 8A to 8E are views of the scheduling by the scheduling circuit 128 (FIG. 1), in which FIG. 8A shows the multiplexing space of one frame period determined by the transport rate; FIG. 8B shows a state where the compressed audio data is arranged; FIG. 8C shows a state where the video data of an amount calculated by the supervising etc. of the video STD buffer 220 etc. is arranged in the surplus multiplexing space; FIG. 8D shows a state where the finally surplus multiplexing space is filled by stuffing or padding; and FIG. 8E shows a transport stream generated by the repetition of the above operations.

Figure 9:
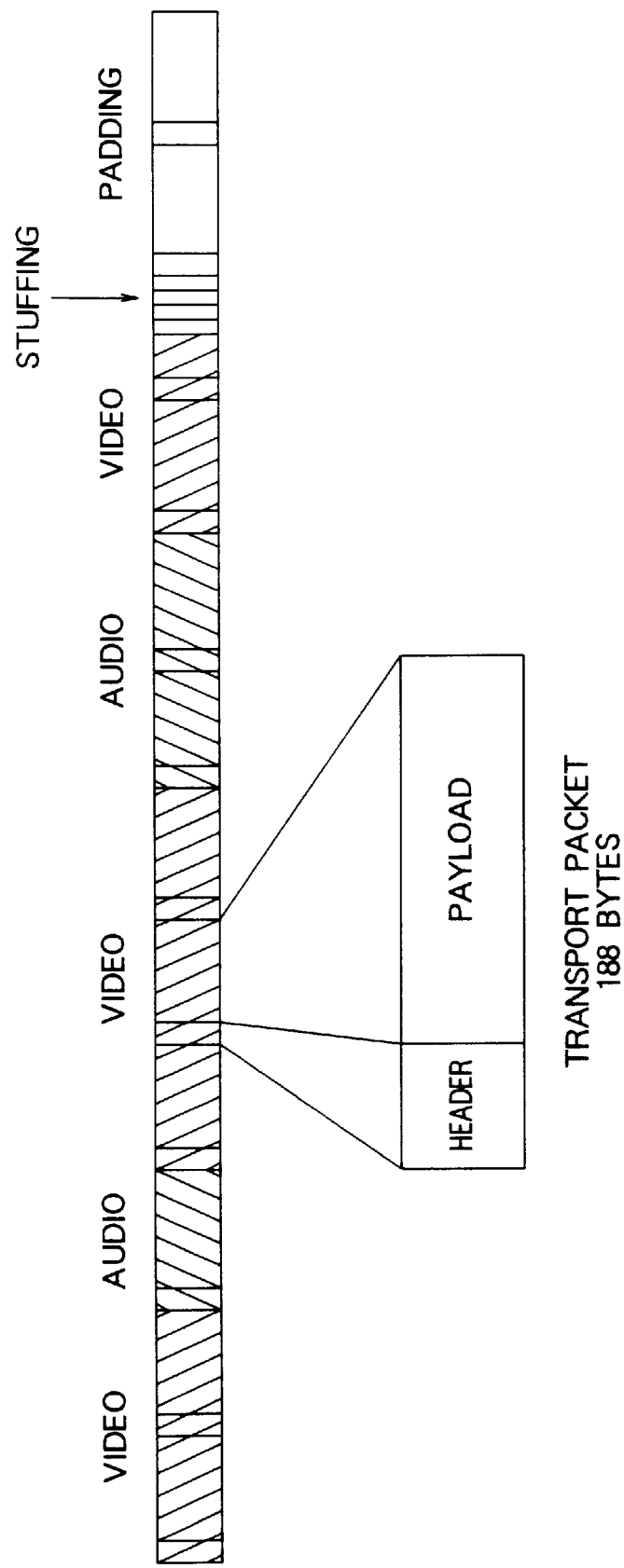
FIG. 9 is a view of the relationship of a transport stream and a transport packet shown in FIGS. 8A to 8E.

FIG. 9 shows a relationship between the transport stream and transport packet shown in FIGS. 8A to 8E.

FIGS. 10A to 10C show a processing for adding the PES header to the elementary streams of the compressed video data and the compressed audio data, multiplexing the same, and further adding a transport packet header to this. Note that, the part of a circle A of FIG. 10B shows a part obtained by supplementing a stuffing byte for alignment of the header of the transport packet prescribed by the MPEG2 and the PES header. The stuffing byte is inserted into the stuffing byte area of the transport packet header, but here, for easy understanding, it is indicated by a blank portion behind the header. The part of a circle B indicates the part of the padding packet in which the transport rate remains and no elementary stream is accommodated in the payload of the transport packet.

Below, an explanation will be made of the order of scheduling by the scheduling circuit 128 by referring to FIGS. 8A and 8E to FIGS. 10A to 10C.

The scheduling circuit 128 first performs the scheduling for arranging the transport packet obtained by accommodating the compressed audio data in the payload part at a predetermined position in the frame period as shown in FIG. 8B for the multiplexing space in which no data is multiplexed shown in FIG. 8A.

Next, the scheduling circuit 128 performs the scheduling for arranging the transport packet obtained by accommodating the compressed video data in the payload part at a position other than the position at which the transport packet accommodating the compressed audio data in the multiplexing space is arranged as shown in FIG. 8C. Note that, the relationship of the transport packet and the transport stream is as shown in FIG. 9.

Next, the scheduling circuit 128 performs the scheduling for performing the stuffing and padding respectively shown in the circles A and B of FIG. 10B in the surplus multiplexing space in which the transport packets accommodating the compressed video data and the compressed audio data are arranged as shown in FIG. 8D.

The scheduling circuit 128 sequentially performs the above explained scheduling for every video frame cycle, controls the switch circuit 124 according to this scheduling, and multiplexes the compressed video data and the compressed audio data and selects the compressed video data and the compressed audio data so as to obtain the transport stream shown in FIG. 8E.

Further, the packetizing circuit 126 adds the PES header to the compressed video data (video elementary stream) and the compressed audio data (audio elementary stream) as shown in FIGS. 10A and 10C, adds the transport packet header as shown in FIG. 10B, and transmits the resultant data via the ATM communication line to the audio and/or video data receiving apparatus 2 (FIG. 2).

The audio and/or video data receiving apparatus 2 receiving the transport stream via the ATM communication line performs an operation similar to that explained in the first embodiment, demultiplexes the compressed video data and the compressed audio data from the transport stream, and further expands and decodes these data and outputs the same.

As explained above, by arranging the transport packets in which the compressed audio data are accommodated in the payload part in the transport stream at a predetermined timing for every video frame cycle under a condition where breakdown does not occur in the audio STD buffer 228 and arranging the transport packets accommodating the compressed video data in the surplus part, the scheduling circuit 128 can perform the scheduling without causing a breakdown in the video STD buffer 220 and the audio STD buffer 228.

Third Embodiment

Below, a third embodiment of the present invention will be explained.

When the scheduling explained in the second embodiment is carried out, the scheduling circuit 128 must perform the scheduling processing based on the length of the frame period and the amount (multiplexable amount) of the compressed video data with which the data can be multiplexed to the transport stream and transmitted in each frame period.

FIG. 11 is a view of a boundary of the frame cycle on the transport stream transmitted by the audio and/or video data transmitting apparatus 1 (FIG. 1) to the audio and/or video data receiving apparatus 2 (FIG. 2).

As shown in FIG. 11, when any usual transport rate is set, the boundary of the frame cycle and the boundary of the transport packet do not coincide. Accordingly, in order to find the amount of the compressed video data which can be multiplexed in the frame cycle, it is necessary to calculate the packet number and the address of the offset byte as shown in FIG. 11.

FIGS. 12A to 12C are views of the conditions of the effective multiplexing space in an initial part of the frame cycle.

As shown in FIG. 12C, when the transport packet on the boundary of the first frame cycle of a certain frame cycle is not filled by the compressed video data and compressed audio data up to the frame boundary in the frame cycle before that frame cycle, the transport packet cannot be used in this frame cycle.

That is, where the padding bit etc. are accommodated up to the middle of the payload part of the transport packet, the compressed audio data and the compressed video data cannot be accommodated in the payload part of the same transport packet. Further, when it is intended to accommodate the compressed audio data and the compressed video data from the middle of the payload part of the transport packet, there arises a necessity of calculating the packet number and the address of the offset byte for finding up to where the audio and video data enter at the previous frame cycle.

In this way, when the boundary of the frame cycle and the boundary of the transport packet do not coincide, the calculation of the offset byte and the calculation for determination under the boundary conditions become complex and the coding configuration of the software (program) for executing these calculations or the hardware configuration for executing these calculations become complex.

In the third embodiment, an explanation will be made of a method in which the frame cycle of the audio and/or video data and the boundary of the transport packet are brought into coincidence (aligned), the compressed video data and the compressed audio data are multiplexed in units of transport packet size [(188 bytes)—(transport packet header size)], and the transport stream is thus generated.

Figure 13:
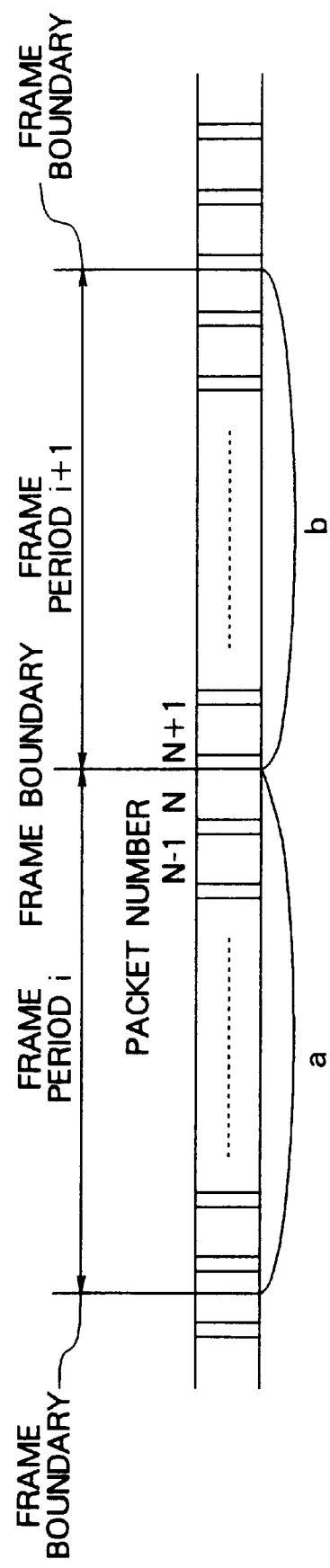
FIG. 13 is a view of the transport stream in which the boundary of the frame cycle and the boundary of the transport packet are made to coincide.

FIG. 13 is a view of the transport stream in which the boundary of the frame cycle and the boundary of the transport packet are brought into coincidence.

That is, as shown in FIG. 13, in the third embodiment, the boundary of the video frame cycle and the boundary of the transport packet contained in the transport stream are brought into coincidence and the sum of the amounts (multiplexable amounts) of the compressed video data and the compressed audio data which are multiplexed by the audio and/or video data transmitting apparatus 1 for every video frame cycle and transmitted via the ATM communication line to the audio and/or video data receiving apparatus 2 is specified to a multiple of the amount of data that can be accommodated in the payload part of the transport packet.

Figure 14:
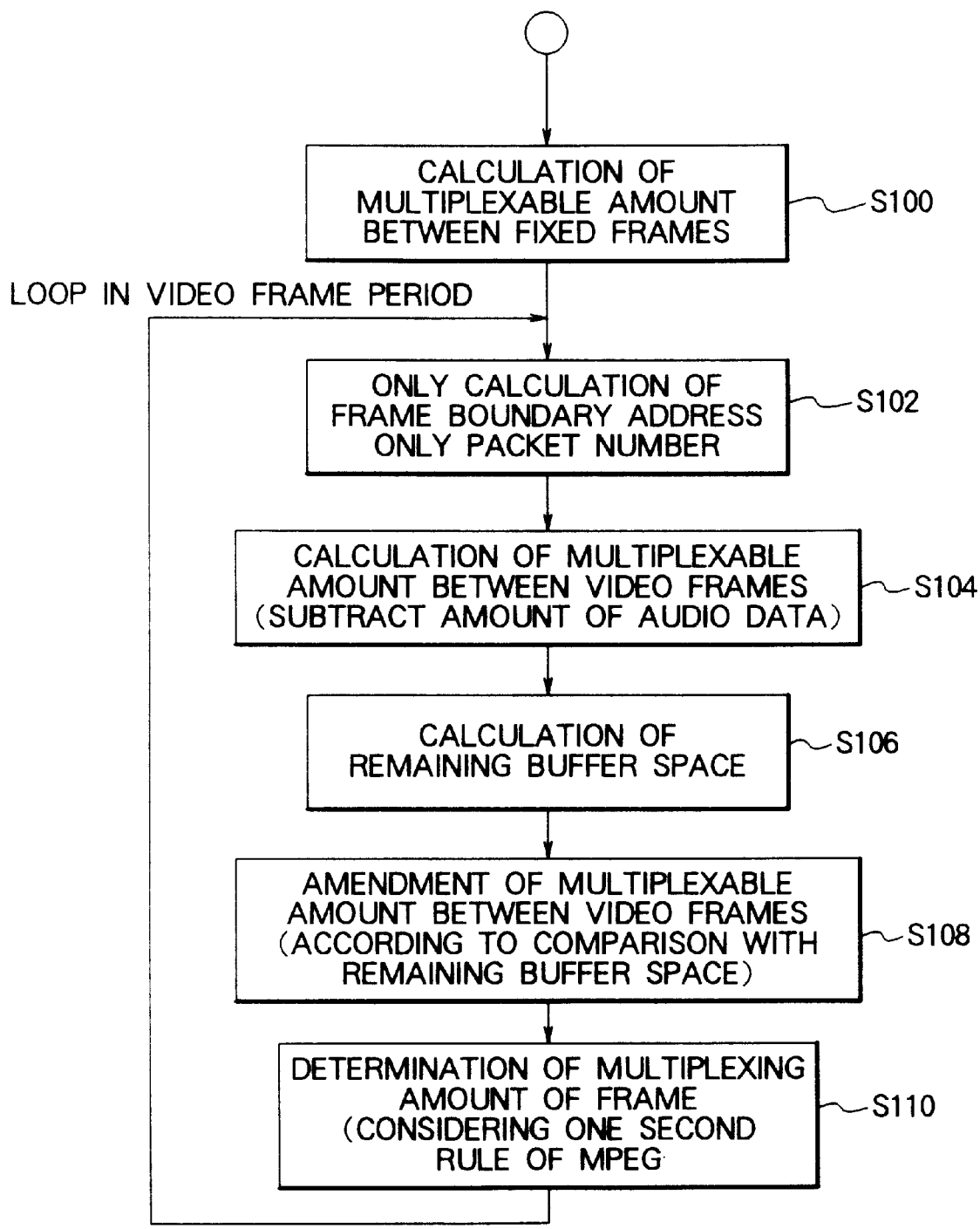
FIG. 14 is a flowchart of a multiplexing scheduling processing by the scheduling circuit (FIG. 2) where the amount of data of the compressed video data which can be multiplexed in the transport packet for every frame cycle is limited to a multiple of the capacity of the payload part of the transport packet [every (188 bytes)—(transport—packet header size)]

FIG. 14 is a flowchart of the multiplexing scheduling processing by the scheduling circuit 128 where the amount of the compressed video data which can be multiplexed in the transport packet for every frame cycle is limited to a multiple of the capacity of the payload part of the transport packet [every (188 bytes)—(transport packet header size)].

As shown in FIG. 14, the scheduling circuit 128 calculates the amount [fixed value, not limited to a multiple of [every (188 bytes)—(transport packet header size)] of the compressed video data which can be multiplexed for every frame cycle at step 100 (S100).

At step 102 (S102), the scheduling circuit 128 performs the calculation of address of the frame boundary (only packet number).

At step 104 (S104), the scheduling circuit 128 calculates the amount (multiplexable amount) of the compressed video data which can be multiplexed in the transport stream in this video frame (frame cycle) by subtracting the audio data (compressed audio data) multiplexed to the transport stream in the loop before the flow shown in FIG. 14 from the initial value in the loop before the multiplexable amount.

At step 106 (S106), the scheduling circuit 128 calculates the remaining capacity (remaining buffer space) of the VBV buffer supposing the video STD buffer 220.

At step 108 (S108), the scheduling circuit 128 compares the remaining buffer space with the multiplexable amount found at the processing of S104 and amends the value of the multiplexable amount in this frame cycle.

At step 110 (S110), the scheduling circuit 128 determines the amount of the compressed video data to be multiplexed to the transport stream in this frame for every [(188 bytes)—(transport packet header size)] by considering the one-second rule of the MPEG2 system, then the operation routine proceeds to the processing of S102. Here, based on the multiplexable amount of the compressed video data calculated here, the scheduling circuit controls the switch circuit 124 and the packetizing circuit 126.

The configurations and operations of the audio and/or video data transmitting apparatus 1 and the audio and/or video data receiving apparatus 2 other than the processing of the scheduling circuit 128 in the third embodiment explained above are the same as those of the first embodiment and the second embodiment. Similar to the first embodiment and the second embodiment, the audio and/or video data can be transmitted via the ATM communication line.

Figure 15:
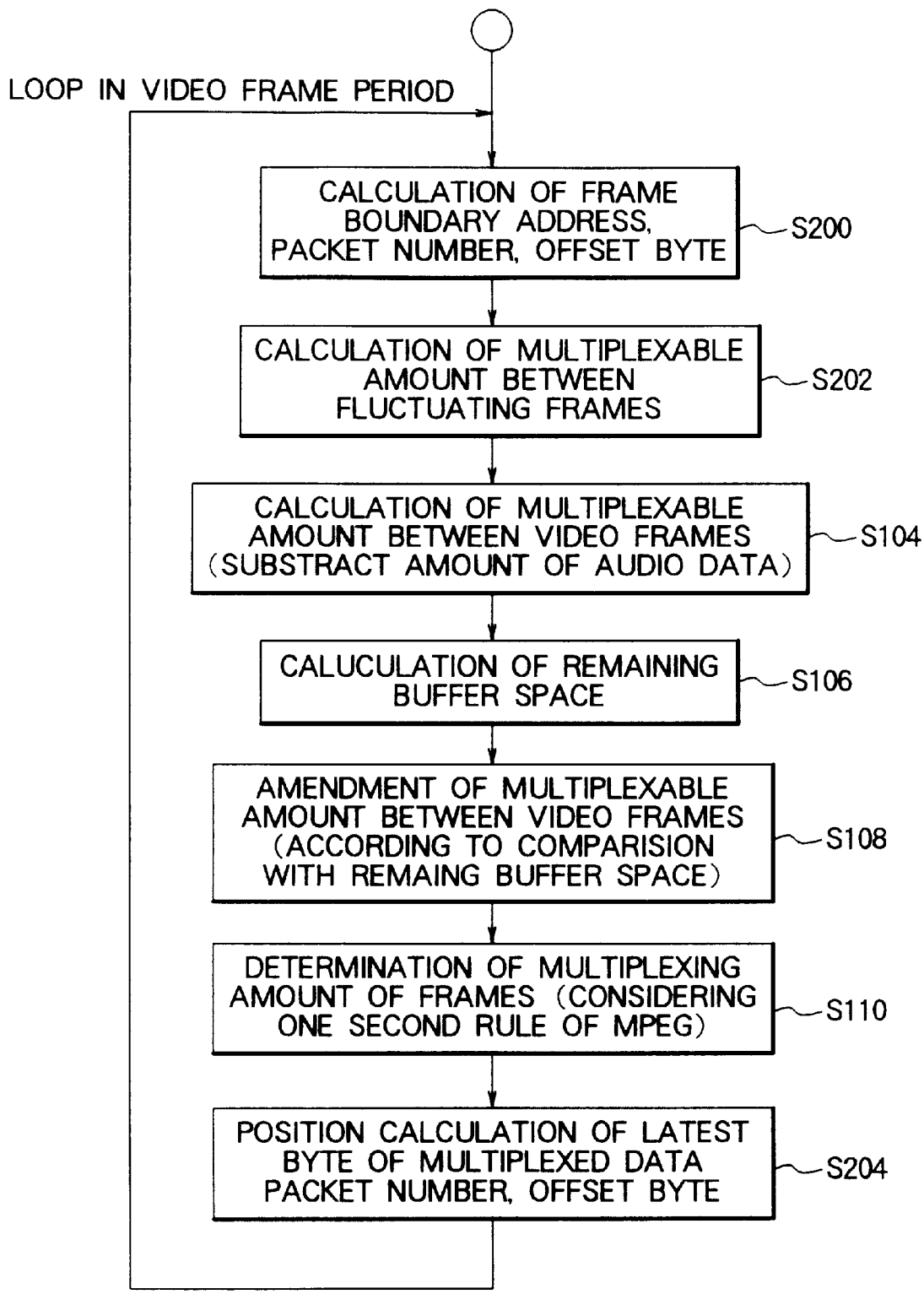
FIG. 15 is a flowchart of the multiplexing scheduling processing by the scheduling circuit (FIG. 2) where the amount of data of the compressed video data which can be multiplexed in the transport packet for every frame cycle may be arbitrarily set.

FIG. 15 is a flowchart of the multiplexing scheduling processing by the scheduling circuit 128 where the amount of the audio and/or video data which can be multiplexed in the transport packet for every frame cycle is arbitrarily set.

As seen from a comparison of FIG. 14 and FIG. 15, when not following the scheduling method shown in the third embodiment, the scheduling circuit 128 must perform the calculation of the offset byte other than the packet number at S200 of FIG. 15 corresponding to the processing of S102 of FIG. 14.

Further, when following the scheduling method shown in the third embodiment, it is sufficient so far as the scheduling circuit 128 only calculates the multiplexable amount of a fixed value only one time throughout all processings as indicated at S100 of FIG. 14, but in contrast, when not following the scheduling method shown in the third embodiment, it must calculate the multiplexable amount of the fluctuation value for every frame cycle at S202 of FIG. 15.

Further, when not following the scheduling method shown in the third embodiment, the processing of S204 of FIG. 15, that is, the calculation of the position of the latest byte of the multiplexed data (transport stream), packet number and the offset byte, becomes necessary.

Note that, when not following the scheduling method shown in the third embodiment, in actuality, at S104 of FIG. 15, it is necessary to perform calculation to determine if the boundary of the frame cycle exists in the header part of the transport packet and calculation to determine if the transport packet on the boundary at the start point of the frame cycle is filled by the video and audio data up to the boundary byte thereof etc.

In this way, according to the scheduling method of the scheduling circuit 128 shown in the third embodiment, the scheduling is carried out in units of transport packet size, therefore, in the boundary of the frame cycle, it becomes unnecessary for the scheduling circuit 128 to manage the address in units of bytes and the calculation of the boundary conditions at the start point of the frame cycle can be omitted. Further, the address calculation of the final byte of the compressed video data or the compressed audio data for every frame cycle can be omitted.

Note that, due to the scheduling in the scheduling circuit 128, that is, the difference of the frame cycle of the audio and/or video data and the transmission rate of the ATM communication line, an error sometimes occurs. A method of avoiding an accumulation of this error will be explained.

When defining the transmission rate of the ATM communication line as $T_{RATE}$, the amount of data transfer a of the frame cycle is represented by the following Equation 3:

$$a = T_{RATE}/29.97 \qquad (3)$$

The unit of $T_{RATE}$, however, is a byte/sec, while the unit of $\underline{a}$ is a byte.

In this case, the number N of the average transport packet transferred during one frame cycle is represented by the following Equation 4:

$$N = a/(188-H) \qquad (4)$$

H is the byte number of the transport packet header.

Accordingly, the error $\underline{e}$ caused in one frame cycle is represented by the following Equation 5:

$$e = a \times (188-H-N) \qquad (5)$$

where the unit of $\underline{e}$ is a byte.

By modifying the processing of the scheduling circuit 128 so that the error $\underline{e}$ shown in Equation 5 is added for every frame cycle, and the scheduling is carried out so that one padding packet is excessively transmitted at a frame cycle where the cumulative value of $\underline{e}$ exceeds 188 bytes, an accumulation of the error $\underline{e}$ can be prevented.

Figure 16:
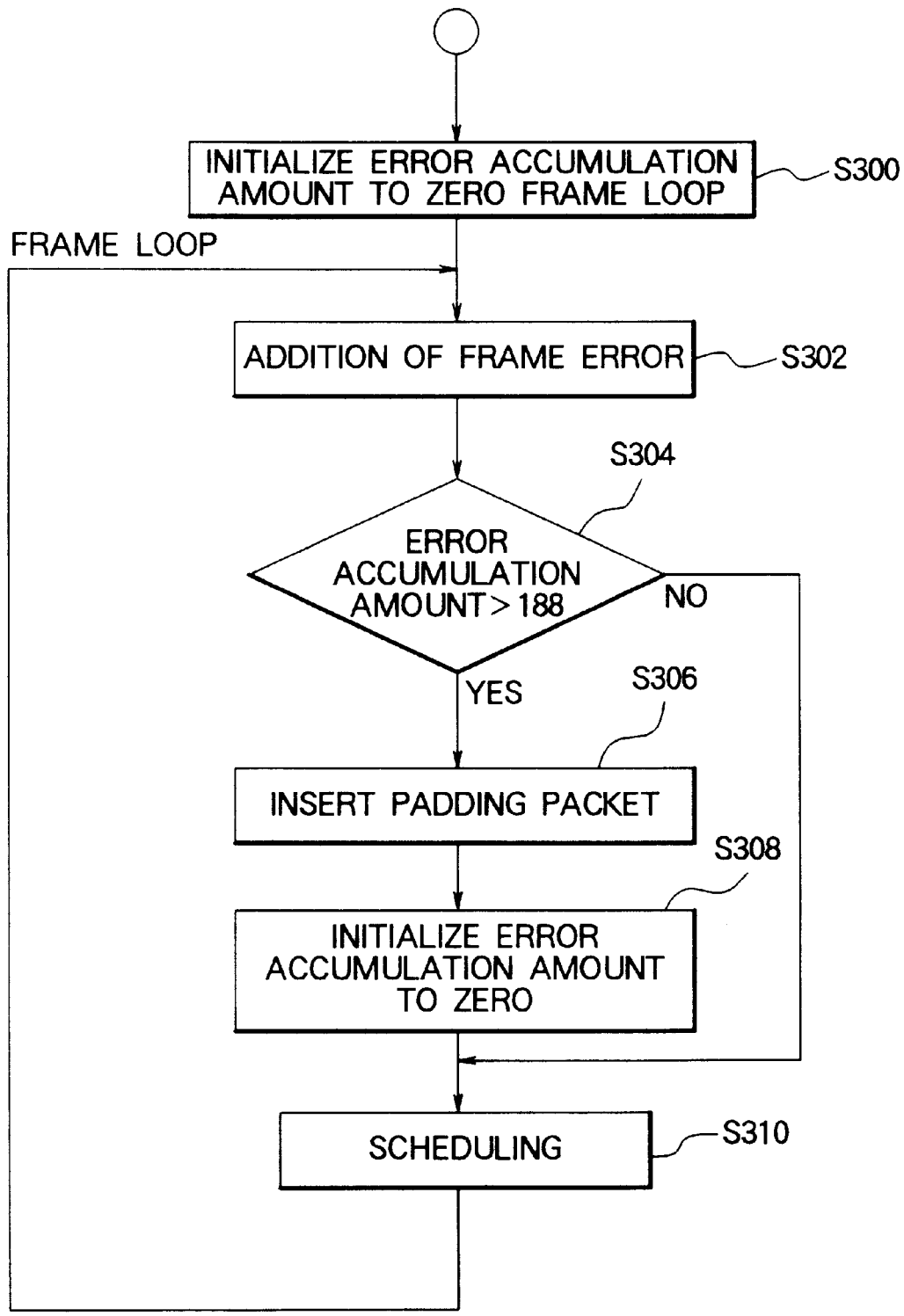
FIG. 16 is a flowchart of the processing for avoiding an accumulation of an error e due to a difference of an ATM communication line and the audio and/or video data.

A flowchart of the processing for avoiding the accumulation of the error $\underline{e}$ mentioned above is shown in FIG. 16.

Note that, according to the scheduling method of the scheduling circuit 128 shown in the third embodiment, by using the multiplexing method of the MPEG2 transport stream, the configuration of the software when the scheduling circuit 128 is realized as software of a personal computer or other computer can be simplified. Further, even in a case where the scheduling circuit 128 is realized by hardware, the configuration thereof can be simplified. Even in a case where the scheduling circuit 128 is constituted by either of hardware or software, the development period can be greatly reduced.

As explained above, according to the audio and/or video data transmitting apparatus, system, and method according to the present invention, when the audio and/or video data is compressed and coded on the transmission side by the MPEG2 system or the like and transmitted via a high speed digital communication line such as an ATM communication line, the calculation of the remaining capacity of the STD buffer on the reception side can be facilitated and simplified.

Further, according to the audio and/or video data transmitting apparatus, system, and method according to the present invention, even if the audio and/or video data is compressed and coded on the transmission side by the MPEG2 system or the like and transmitted via a high speed digital communication line such as an ATM communication line, a breakdown such as overflow or underflow is not caused in the STD buffer on the reception side.

What is claimed is:

1. A transmitting apparatus for transmitting a video signal and an audio signal, comprising:
    means for accommodating said video signal and audio signal in a plurality of transport packets;
    means for transmitting said transport packets including said video signal and said audio signal; and
    wherein an amount of data transmitted in a video frame cycle is a whole multiple of a size of said transport packet minus a size of the header of said transport packet such that the boundary of the transport packets are aligned with the boundary of the frame cycle.

2. A transmitting apparatus according to claim 1, wherein said transmitting apparatus comprises:
    a video buffer for receiving said video signal;
    an audio buffer for receiving said audio signal;
    a means for selectively taking out the video signal or audio signal from said video buffer or audio buffer;
    an accommodating means for accommodating said taken out video signal or audio signal in a payload area of said transport packet; and
    a means for controlling said selective taking out means and said accommodating means;
    said control means controlling said selective taking out means and said accommodating means so that the amount of data output from said transmitting apparatus in a video frame cycle becomes a whole multiple of said transport packet.

3. A transmitting apparatus according to claim 2, wherein said control device supervises an empty size of said video buffer and controls said selective taking out means and said accommodating means so that the amount of said video signal to be multiplexed in said video cycle is adjusted in accordance with said detected empty size.

4. A transmitting apparatus according to claim 2, wherein said selective taking out means and said accommodating means take out said audio signal from said audio buffer and accommodate the same so that the audio signal from said audio buffer is accommodated in the transport packet of a period determined in advance in said video frame cycle.

5. A transmitting apparatus according to claim 4, wherein said selective taking out means and said accommodating means take out said video signal from said video buffer and accommodate the same so that said video signal is accommodated in a payload part of the transport packet in which said audio signal is not accommodated.

6. A transmitting system comprising:
    a video encoder for encoding the video signal;
    an audio encoder for encoding the audio signal;
    a video buffer for receiving said encoded video signal;
    an audio buffer for receiving said encoded audio signal;
    a means for selectively taking out the video signal or audio signal from said video buffer or audio buffer;
    an accommodating means for accommodating said taken out video signal or audio signal in a payload area of said transport packet; and
    said control means controlling said selective taking out means and said accommodating means so that the amount of data output from said transmitting system in the video frame cycle becomes a whole multiple of a size of said transport packet in said video frame cycle minus a size of the header of said transport packet such that the boundary of the transport packets are aligned with the boundary of the frame cycle.

7. A transmitting method including the steps of:
    multiplexing a video signal and an audio signal;
    accommodating the video signal or audio signal in a transport packet;
    transmitting the same; and
    wherein the amount of data transmitted in a video frame cycle is a whole multiple of a size of said transport packet in said video frame cycle minus a size of the header of said transport packet such that the boundary of the transport packets are aligned with the boundary of the frame cycle.

8. A transmitting method according to claim 7, comprising the steps of:
    receiving said video signal at a video buffer;
    receiving said audio signal at an audio buffer;
    selectively taking out the video signal or audio signal from said video buffer or audio buffer;
    accommodating said taken out video signal or audio signal in a payload area of said transport packet; and
    controlling said selective take out operation and said accommodating operation, wherein
    said control operation controls said selectively take out operation and said accommodating operation so that the amount of data output by said transmitting method in a video frame cycle becomes a whole multiple of said transport packet.

9. A transmitting method according to claim 8, wherein said control operation supervises an empty size of said video buffer and controls said selectively take out operation and said accommodating operation so that the amount of said video signal to be multiplexed in said video cycle is adjusted in accordance with said detected empty size.

10. A transmitting method according to claim 8, wherein said selective take out operation and said accommodating operation take out said audio signal from said audio buffer and accommodate the same so that the audio signal from said audio buffer is accommodated in the transport packet of a period determined in advance in said video frame cycle.

11. A transmitting method according to claim 10, wherein said selective take out operation and said accommodating operation take out said video signal from said video buffer and accommodate the same so that said video signal is accommodated in a payload part of the transport packet in which said audio signal is not accommodated.

12. Stream processing apparatus for processing a video stream encoded by a video encoder and an audio stream encoded by an audio encoder, comprising:

multiplexing means for multiplexing said video stream and said audio stream to generate a multiplexed stream;

packetizing means for packetizing said multiplexed stream into a plurality of transport packets;

means for controlling a multiplexing schedule of said multiplexing means and a packetizing schedule of said packetizing means so that a number of bits of said multiplexed stream to be packetized into said transport packets correspond to an integral multiple of a number of bits of a payload area of said transport packets.

13. A method for processing a video stream encoded by a video encoder and an audio stream encoded by an audio encoder, comprising the steps of:

multiplexing the video stream and the audio stream to generate a multiplexed stream;

packetizing the multiplexed stream into a plurality of transport packets;

controlling the multiplexing and packetizing so that a number of bits of the multiplexed stream to be packetized into the transport packets corresponds to an integral multiple of a number of bits of a payload area of the transport packets.

14. A method for processing a video stream encoded by a video encoder and an audio stream encoded by an audio encoder, comprising the steps of:

multiplexing the video stream and the audio stream to generate a multiplexed stream;

packetizing the multiplexed stream into a plurality of transport packets;

controlling the multiplexing and packetizing so that a boundary of a frame period of said video stream is aligned with a boundary of the transport packets.

15. Stream processing apparatus for processing a video stream encoded by a video encoder and an audio stream encoded by an audio encoder, the apparatus comprising:

multiplexing means for multiplexing said video stream and said audio stream to generate a multiplexed stream;

packetizing means for packetizing said multiplexed stream into a plurality of transport packets;

means for controlling the multiplexing and packetizing so that a boundary of a frame period of said video stream is aligned with a boundary of said transport packets.

16. Stream processing apparatus for processing a video stream encoded by a video encoder and an audio stream encoded by an audio encoder, the apparatus comprising:

multiplexing means for multiplexing said video stream and said audio stream based on a multiplexing schedule to generate a multiplexed stream;

packetizing means for packetizing said multiplexed stream into a plurality of transport packets based on a packetizing schedule;

transmitting means to transport said packets including said video stream and said audio stream; and scheduling means for generating said multiplexing schedule and said packetizing schedule every video frame period based on bit remaining capacities of system target decoder buffers for buffering a transmitted video stream and transmitted audio stream so as to prevent overflowing and underflowing of said system target decoder buffers, wherein said multiplexing schedule defines at least a number of bits of said audio stream to be transmitted within said video frame period and a number of bits of said video stream to be transmitted within said video frame period.

17. A method for processing a video stream encoded by a video encoder and an audio stream encoded by an audio encoder, comprising the steps of:

multiplexing said video stream and said audio stream based on a multiplexing schedule to generate a multiplexed stream;

packetizing the multiplexed stream into a plurality of transport packets based on a packetizing schedule;

transporting the packets including the video stream and the audio stream;

generating the multiplexing schedule and the packetizing schedule every video frame period based on bit remaining capacities of system target decoder buffers for buffering a transmitted video stream and transmitted audio stream so as to prevent overflowing and underflowing of the system target decoder buffers, wherein the multiplexing schedule defines at least a number of bits of the audio stream to be transmitted within the video frame period and a number of bits of the video stream to be transmitted within the video frame period.

* * * * *